United States Patent [19]

Schulz-Walz et al.

[11] 4,222,927
[45] Sep. 16, 1980

[54] DISPERSIONS OF POWDERS IN UNSATURATED POLYESTERS

[75] Inventors: Hansjochen Schulz-Walz, Krefeld; Bernhard Hess, Moers; Johannes Beckers, Kempen; Werner Klöker, Krefeld, all of Fed. Rep. of Germany

[73] Assignee: Bayer Aktiengesellschaft, Leverkusen, Fed. Rep. of Germany

[21] Appl. No.: 922,273

[22] Filed: Jul. 6, 1978

[30] Foreign Application Priority Data

Jul. 12, 1977 [DE] Fed. Rep. of Germany ....... 2731320

[51] Int. Cl.$^2$ ............................................. C08L 67/06
[52] U.S. Cl. .................................. 260/40 R; 525/444
[58] Field of Search .............. 260/40 R, 861; 525/444

[56] References Cited

U.S. PATENT DOCUMENTS

| 2,388,319 | 11/1945 | Fuller | 260/40 R X |
| 2,407,479 | 9/1946 | D'Alelio | 260/861 X |
| 2,623,025 | 12/1952 | Dearing et al. | 260/861 X |
| 3,361,705 | 1/1968 | Kay et al. | 260/40 R X |
| 3,795,650 | 3/1974 | Burns | 260/40 R X |
| 3,844,995 | 10/1974 | Kloker et al. | 260/40 R X |

Primary Examiner—Sandra M. Person
Attorney, Agent, or Firm—Conolly and Hutz

[57] ABSTRACT

$\alpha,\beta$-Ethylenically unsaturated polyesters obtained from dicarboxylic acids and monohydric and dihydric alcohols having acid numbers of 1–50 and hydroxyl numbers of 10–80, 1,5–2,5 mols of dicarboxylic acids and 1,5–2,5 mols of monohydric alcohols having been employed, per mol of diols, in their preparation, are an excellent basis for dispersions containing powdery insoluble substances.

3 Claims, No Drawings

DISPERSIONS OF POWDERS IN UNSATURATED POLYESTERS

The present invention relates to dispersions of powdery substances in unsaturated polyesters which are free from copolymerisable monomers. These dispersions according to the invention represent an excellent form in which thickning agents, pigments, fillers and other solid auxiliary agents can be admixed, in a finely divided form, to unsaturated polyester resins.

DE-OS (German Published Specification) No. 2,223,989 has disclosed mixtures of inorganic thickeners, that is to say preferably oxides and hydroxides of the elements of main group 2 and 3 (groups IIa and IIIa) of the periodic system, and of a polyester having acid numbers of 5 to 50 and hydroxyl numbers of 100 to 300. As a result of the incorporation of radicals of monohydric alcohols as chain terminating agents, this polyester has a relatively low viscosity, so that it can incorporate substantial amounts of inorganic thickeners and can serve as the basis for a thickening agent. Since its viscosity hardly increases on adding thickening agents, the pastes prepared therefrom can be stored for a long time.

Such mixtures are in the meantime gaining great importance, since, in the manufacture of sheet moulding compounds (SMC), the mixing of the batches has been largely automated. As a rule, it is desired to carry out the mixing continuously, and a precondition for this is that the solid or pulverulent additives used, such as fillers, pigments and thickening agents and the like, are beforehand worked into a paste in a suitable liquid or, if higher quality is demanded, are ground on a roll mill. The fillers, such as chalk, dolomite, kaolin or others, are usually worked into a paste in the polyester resin, since their amounts approximately correspond to the amount of the resin. The pigments have hitherto also been ground in the polyester resin used, whilst other, smaller amounts of solid additives, such as, for example, thickening agents, release agents or thixotropic agents, are added as powders. In continuous mixing installations it is necessary, for reasons associated with the technical aspects of mixing, to introduce all constituents as pastes, and for streamlining reasons it is necessary to be able to use a single paste resin.

Frequently, such pastes are also combined into one or two mixed pastes, since it is easier accurately to meter continuously larger amounts of one paste than small amounts of different pastes. The consequence of these technical requirements is that the amount of paste base introduced is becoming larger than hitherto customary. Frequently, amounts of 10-15 parts by weight per 100 parts by weight of the polyester resin used are required. Because of this large amount, customary liquid plasticisers are inapplicable not only for the reasons already mentioned but above all because they do not copolymerise during the curing of the polyester resin and hence tend to sweat out. Furthermore, the mechanical, thermal and electrical properties of the cured products are worsened substantially.

Customary styrene-containing unsaturated polyester resins cannot be used since they tend to polymerise prematurely. Certain pigment pastes, in particular, do not achieve the required shelf life. On the other hand, it is, particularly in the case of pigment pastes, frequently necessary to make up the colour paste in a single batch for an entire delivery programme, which may often extend over a long period, in order to be able to guarantee constancy of colour.

When using styrene-free, special unsaturated polyesters, such as are described in DE-OS (German Published Specification) No. 2,223,989, it is found that when using larger amounts the water absorption of the pressed mouldings rises drastically. This rise is not yet noticeable if these resins are added to the resin mats only in the form of MgO pastes or CaO pastes, because in such cases only 1-3 parts by weight are employed per 100 parts by weight of polyester resin. However, as soon as larger amounts are required, as described above, the increase in water absorption is no longer acceptable.

In the case of mouldings which are produced by one of the conventional laminating processes, for example in the case of boats, the laminate is in general covered with a coloured top coat. If articles with frequently changing colours are produced in this manner, or if colours have to be toned by adding small amounts of other pigments, it is advantageous to use pigment pastes. For the reasons already described, plasticisers or styrene-containing polyesters cannot be considered as the paste base. Polyesters in accordance with DE-OS (German Published Specification) No. 2,223,989 can also not be employed since they worsen the water absorption of a finishing layer to such an extent that after brief storage of the laminate in water blisters and cracks develop.

Surprisingly, it has now been found that the disadvantages described above can be avoided by using an unsaturated polyester which is free of crosslinking monomers, has acid numbers of 1-50, preferably 5-30, and hydroxyl numbers of 10-80, preferably 20-50, and has been produced employing 1.5-2.5 mols of dicarboxylic acids and 1.5-2.5 mols of monohydric alcohols per mol of diols.

Accordingly, the subject of the invention is dispersions which are free from copolymerisable monomers and which consist of (A) 10-80, preferably 30-60, % by weight of pulverulent substances insoluble in B and (B) 90-20, preferably 70-40, % by weight of an $\alpha,\beta$-ethylenically unsaturated polyester obtained from dicarboxylic acids and monohydric and dihydric alcohols, the percentages in each case relating to the sum of the components A and B, characterised in that the unsaturated polyester B has acid numbers of 1-50 and hydroxyl numbers of 10-80 and that 1.5-2.5 mols of dicarboxylic acids and 1.5-2.5 mols of monohydric alcohols have been employed, per mol of diols, in its preparation.

A further subject of the invention as auxiliaries for dispersions according to the invention as assistants for $\alpha,\beta$-ethylenically unsaturated polyester resins.

$\alpha,\beta$-Ethylenically unsaturated polyesters, in the sense of the invention, are the usual condensation products of at least one $\alpha,\beta$-ethylenically unsaturated dicarboxylic acid having, as a rule, 4 or 5 C atoms, or of its ester-forming derivatives, optionally mixed with up to 100 mol %, based on the unsaturated acid component, of at least one aliphatic saturated dicarboxylic acid with 4-10 C atoms or of an aromatic or cycloaliphatic dicarboxylic acid with 8-10 C atoms or its ester-forming derivatives, and at least one polyhydroxy compound, especially dihydroxy compound, with 2-8 C atoms, that is to say polyesters as described by J. Bjorksten et al, "Polyesters and their Applications", Reinhold Publishing Corp., New York 1956.

Examples of unsaturated dicarboxylic acids, or their derivatives, to be used preferentially are maleic anhydride and fumaric acid. However, it is also possible to use, for example, mesaconic acid, citraconic acid, itaconic acid or chloromaleic acid. Examples of the aliphatic saturated dicarboxylic acids, aromatic dicarboxylic acids and cycloaliphatic dicarboxylic acids, or their derivatives, which are to be used are phthalic acid or phthalic anhydride, isophthalic acid, terephthalic acid, hexahydrophthalic acid or tetrahydrophthalic acid and their anhydrides, endomethylenetetrahydrophthalic acid or its anhydride, succinic acid or succinic anhydride and succinic acid esters and chlorides, adipic acid and sebacic acid. In order to prepare resins of low flammability it is possible to use, for example, hexachloroendomethylenetetrahydrophthalic acid (Het-acid), tetrachlorophthalic acid or tetrabromophthalic acid. Polyesters to be used preferentially contain maleic acid radicals of which up to 25 mol % can be replaced by phthalic acid radicals or isophthalic acid radicals. Dihydric alcohols which can be employed are ethylene glycol, 1,2-propanediol, 1,3-propanediol, diethylene glycol, dipropylene glycol, 1,2-, 1,3-, 1,4- and 2,3-butanediol, neopentylglycol, 1,6-hexanediol, 2,2-bis-(4-hydroxycyclohexyl)-propane, bis-oxyalkylated bisphenol A, perhydrobisphenol and others. The use of oligomers of ethylene oxide, propylene oxide and butene oxide, especially diethylene glycol, triethylene glycol, tetraethylene glycol, dipropylene glycol, tripropylene glycol and corresponding oligomers of the various butene oxides, is preferred.

Further modifications are possible by incorporating up to 10 mol %, based on the alcohol component or acid component, of trihydric and tetrahydric alcohols with 6-12 C atoms, such as trimethylolpropane, glycerol and pentaerythritol, as well as of tribasic and tetrabasic carboxylic acids with 6-12 C atoms, such as, for example, trimellitic acid and benzenetetracarboxylic acid. However, it is advisable, in order to avoid gelling and hence an increase in viscosity of the polyester, to employ sufficient monofunctional starting components, where trifunctional and higher-functional compounds are used, that at least one mol of monofunctional compound is chosen per mol of trifunctional compound and at least two mols of monofunctional compound are chosen per mol of tetrafunctional compound.

Preferred monohydric alcohols are aliphatic, cycloaliphatic, aromatic and alkylaromatic alcohols with 1-18 C atoms, for example methanol, ethanol, n- or iso-propanol, n-, iso- or tert.-butanol, the pentanols, hexanols, heptanols and octanols, such as, for example, α-ethylhexanol, up to long-chain alcohols, such as, for example, stearyl alcohol. An example of aromatic monohydric alcohols is benzyl alcohol. Cyclohexanol may be mentioned as an example of cycloaliphatic monohydric alcohols. Unsaturated monoalcohols, such as, for example, allyl alcohol or crotyl alcohol, can also be used.

The molecular weights of the polyesters B, determined as the number-average, should be between 250 and 3,000 (measured by vapour pressure osmometry in dioxane and acetone; if the values differ, the lower value is regarded as correct), and the viscosities of the polyesters B should be between 200 and 1,000 cP.

Relevant pulverulent substances A are inorganic or organic pigments, thixotropic agents, inorganic thickening agents, fillers and the like.

Suitable inorganic thickening agents, in addition to magnesium oxide, are magnesium hydroxide, calcium oxide, calcium hydroxide, zinc oxide, aluminates, titanates, aluminium oxides and their mixed oxides, as well as mixtures of the said products, and also Portland cement. The oxides and hydroxides of the elements of main group 2 and 3 of the periodic table, especially magnesium oxide, are preferred.

Dispersions of 30 to 60% by weight of oxides and/or hydroxides of group 2 and 3 of the periodic table, particularly magnesium oxide and/or magnesium hydroxide, and 70 to 40% by weight of a polyester of maleic acid and/or fumaric acid, dipropylene glycol and α-ethylhexanol, have proved particularly valuable.

In addition to the oxides and/or hydroxides of the 2nd and 3rd group of the periodic table and the special polyesters mentioned, the dispersions according to the invention can contain further additives, for example those which influence the sedimentation and the thixotropy. The thixotropy and sedimentation are above all influenced by inorganic thixotropic agents, such as highly disperse silicas, products with asbestos-like silicate structure, or bentones, or organic thixotropic agents, such as hydrogenated castor oil fatty acids, and preferably organic compounds containing CONH or OCONH groups. These organic thixotropic agents to be used preferentially can be admixed to the dispersions according to the invention or can be built into the polyesters B.

The particularly preferred organic compounds bearing CONH or OCONH groups are those described, for example, in DE-AS (German Published Specifications) Nos. 1,020,428, 1,106,015, 1,182,816, 1,217,611, 1,273,192, 1,569,331 and 1,745,347. Specifically, the compounds concerned are (a) modified unsaturated polyesters, preferably with OH numbers greater than 100 and with acid numbers of up to 30, which are obtainable by reaction of unsaturated linear or branched polyesters, containing hydroxyl groups, with monohydric or polyhydric β,γ-unsaturated ether-alcohols and polyisocyanates. Those of the modified unsaturated polyesters which have been prepared in the presence of oxygen prove to be particularly suitable.

(b) Polyester-amides, whereof mixtures of 3 parts by weight of polyester-amide and 7 parts by weight of white spirit are inhomogeneous at room temperature, and which contain up to 35, preferably 14-30, % by weight of polar groups, inhomogeneous mixtures being understood as mixtures which exhibit a second liquid or solid phase and consequently may exhibit turbidity. Preferably, those polyester-amides are used which are prepared using polycarboxylic acids, polyamines with at least two primary amino groups and either hydroxycarboxylic acids or polyalcohols or aminoalcohols or mixtures of these hydroxy compounds. Preferred polyester-amides have an amide group/ester group ratio of 0.1 to 2.2 and have softening points of less than 230, especially less than 200° C.

(c) Polymeric amides with average molecular weight $M_n$ of 500-10,000, which contain radicals of monoaminomonocarboxylic acids and/or diamines and dicarboxylic acids and of which the hydrogen atoms, present on the carboxamide nitrogen atoms, are substituted entirely or partially by monooxaalkyl or polyoxa-alkyl radicals containing at least 4 C atoms and at least 1 oxa oxygen atom. Examples of such base polymers are poly-ω-caprolactam and poly-ω-capryllactam, as well as the polycondensates of tetramethylenediamine, hexamethylenediamine or octamethylenediamine and succinic acid, adipic acid, suberic acid or sebacic acid. The polymeric amines which impart thixotropy can be obtained from these compounds by oxyalkylation.

(d) Polyurethanes with average molecular weights $M_n$ of 250–5,000, especially of 500–3,000, which
  1. contain, linked in a urethane-like manner, radicals of difunctional carbamic acids and radicals of dihydric hydroxy compounds and optionally also radicals of carbamic acids of lower or higher functionality and/or radicals of hydroxy compounds which are less than or more than dihydric,
  2. are free, or virtually free, from ethylenically unsaturated groups, radicals of fatty acids containing more than 9 C atoms, radicals of adducts of such fatty acids, and isocyanate groups or groups which react like these, and
  3. form homogeneous and clear solutions when mixed with the unsaturated polyester resin to be rendered thixotropic.

(e) Cyclohexylamides of saturated higher fatty acids with at least 10 C atoms, such as of capric acid, myristic acid, palmitic acid, stearic acid, hydroxystearic acid or behenic acid, or mixtures of these cyclohexylamides; for example, the cyclohexylamides of the so-called "main runnings" of the oxidation of paraffins are also suitable.

When preparing the dispersion according to the invention, the agents for conferring thixotropy can simply be admixed, but can also, if desired, be condensed into the unsaturated polyester B, during its preparation, by cooking with the starting components of the said polyester, or can be condensed onto the polyester after the latter has been prepared.

Particularly preferred polyesters which have been rendered thixotropic in this way are, for example, the reaction products which are prepared from unsaturated polyesters which contain hydroxyl groups and have a hydroxyl number of 10–80 and an acid number of 1–50, and from reaction products, which predominantly contain one free isocyanate group, obtained from polyisocyanates and monohydroxy compounds.

The isocyanates are thixotropic agents which are outstandingly suitable for incorporation into, or condensation onto, unsaturated polyesters B. Preferred examples which may be mentioned are aliphatic, cycloaliphatic and aromatic monoisocyanates with at least 4 C atoms, such as, for example, dodecyl isocyanate, phenyl isocyanate, naphthyl isocyanate, cyclohexyl isocyanate and the $C_1$–$C_4$-alkyl derivatives of the said isocyanates, diisocyanates such as, for example, 1,6-hexamethylene diisocyanate, isophorone diisocyanate, 4,4'-dicyclohexylmethane diisocyanate, 1-methylcyclohexane 2,4- and 2,6-diisocyanate and the mixtures of these isomers, 2,4- and 2,6-toluylene diisocyanate and the mixtures of these isomers, naphthylene 1,5-diisocyanate, 4,4'-diphenylmethane diisocyanate and xylylene 1,3- and 1,4-diisocyanate, higher-molecular polyisocyanates, such as can be obtained from polyisocyanates and compounds containing hydroxyl groups (compare, for example, German Pat. Nos. 870,400 and 909,186) as well as triisocyanates, such as 4,4'-triphenylmethane triisocyanate, and polyarylpolyalkylene polyisocyanates, such as are obtained by aniline-aldehyde (for example formaldehyde) condensation and subsequent phosgenation, or dimerised or trimerised toluylene diisocyanate.

Amongst the polyisocyanates mentioned, diisocyanates and polyisocyanates, of which the functionality can be reduced to 2 or 1 by reaction with Zerewitinoff H-acidic, monofunctional compounds, for example monohydric alcohols and/or monobasic acids, are preferred.

Thixotropic agents are as a rule employed in amounts of 0.1–10, preferably 1–5, % by weight based on polyester resin.

In addition, the dispersions according to the invention can contain organic and/or inorganic fillers in a fibrous and/or pulverulent form, for example kaolin, magnesium carbonate and calcium carbonate, quartz powder, asbestos powder, thermoplastic powders, for example polyethylene powder and other macromolecular crosslinked and non-crosslinked products in powder form. Examples of suitable crosslinked macromolecular substances are ground thermosetting plastics, for example cured unsaturated polyester resin, cured melamine-formaldehyde resin and cured ureaformaldehyde resin. Examples of fibrous fillers are chopped glass fibres, asbestos fibres, "organic chemical fibres" and natural fibres.

The preferred field of use of the mixtures according to the invention is their use for thickening unsaturated polyester solutions in copolymerisable monomers, for the production of resin mats and compression moulding compositions. Since such mixes must contain peroxides, preferably organic peroxides, in order to be able to convert these mixes into mouldings, it can be advantageous already to incorporate the organic peroxides into the dispersions according to the invention. Examples of suitable peroxides for resin mats and compression moulding compositions are benzoyl peroxide, tert.-butyl perbenzoate, perketals and the like. The perketals are particularly advantageous. They exhibit the longest shelf life in the presence of basic products.

The dispersions according to the invention can be admixed to the unsaturated polyester resins which are to be modified, in amounts of 1–30% by weight based on unsaturated unmodified polyester resin. If the dispersions according to the invention contain inorganic thickeners, the amounts are so chosen that 0.1–10% by weight, preferably 0.5–2.5% by weight, relative to unsaturated, unmodified polyester resin, of inorganic thickener are added to the unsaturated polyester resins.

The unsaturated polyesters of those polyester resins which can be modified by using the dispersions according to the invention can be prepared from the components listed above for the preparation of polyester B.

The acid numbers of the polyesters should be between 10 and 100, preferably 10 and 40, the OH numbers should be between 10 and 150, preferably between 20 and 100, and the molecular weights, measured as number-averages, should be between about 500 and 5,000, preferably between about 100 and 3,000 (measured by vapour pressure osmometry in dioxane and acetone; if the values differ, the lower value is regarded as correct).

Preferred copolymerisable vinyl and vinylidene compounds for the modified polyester resins are the unsaturated compounds conventionally used in polyester technology, which preferably carry α-substituted vinyl groups or β-substituted allyl groups, preferably styrene, but also, for example, nuclear-chlorinated, nuclear-alkylated and nuclear-alkenylated styrenes, in which the alkyl groups can contain 1 to 4 carbon atoms, such as, for example, vinyltoluene, divinylbenzene, α-methylstyrene, tert.-butylstyrene and chlorostyrenes, vinyl esters of carboxylic acids with 2-6 carbon atoms, preferably vinyl acetate, vinylpyridine, vinylnaphthalene, vinylcyclohexane, acrylic acid and methacrylic acid and/or their esters (preferably vinyl, allyl and methallyl esters) with 1-4 carbon atoms in the alcohol component, their amines and nitriles, maleic anhydride, maleate monoesters and diesters with 1-4 carbon atoms in the alcohol component, monoamines and diamines or cyclic imides, such as N-methylmaleimide or N-cyclohexylmaleimide, and allyl compounds, such as allylbenzene and allyl esters, such as allyl acetate, diallyl phthalate, diallyl isophthalate, diallyl fumarate, allyl carbonates, diallyl carbonates, triallyl phosphate and triallyl cyanurate. These monomers are the same monomers from which the dispersions according to the invention are to be free.

"Insoluble" is intended to mean, in the present invention, that on 30 minutes' heating to 80° C., less than 1% by weight of the substance in question dissolves in polyester B.

The percentages mentioned in the examples which follow are percentages by weight, and parts are parts by weight.

EXAMPLES

Resin 1 (comparison, according to DE-OS (German Published Specification) No. 2,223,989)

A mixture of 2,536 parts of α-ethylhexanoic acid, 5,706 parts of dipropylene glycol and 1,738 parts of maleic anhydride, corresponding to a molar composition of 1.0:2.4:1.0, is heated to 200° C. in 8 hours whilst passing nitrogen through the mixture, and is kept at this temperature until an acid number of 22 and a viscosity of 380 mPas (measured at 20° C.) is reached. The product obtained has a hydroxyl number of 200.

Resin 2

A mixture of 2,187 parts of benzyl alcohol, 2,633 parts of 2-ethyl-1-hexanol, 3,453 parts of maleic anhydride and 2,360 parts of dipropylene glycol, corresponding to a molar ratio of 1.15:1.15:2.20:1.00, is heated to 210° C. in 14 hours, whilst passing nitrogen through the mixture, and is kept at this temperature until an acid number of 21 and a viscosity of 320 mPas (measured at 20° C.) is reached. The hydroxyl number is then 40.

Resin 3

A mixture of 9,140 parts of benzyl alcohol, 10,998 parts of 2-ethyl-1-hexanol, 16,583 parts of maleic anhydride and 11,331 parts of dipropylene glycol, corresponding to a molar ratio of 1.0:1.0:2.0:1.0, is heated to 220° C. in 7 hours after the addition of 4.5 parts of hydroquinone, and is kept at this temperature, whilst passing nitrogen through the mixture, until the acid number is 21 and the viscosity is 710 mPas (measured at 20° C.). The product has a hydroxyl number of 15.

Resin 4

247 parts of isopropanol (molar ratio 1.05:1.0) are added to 571 parts of toluylene diisocyanate (a mixture of the 2,4-isomer and 2,6-isomer) in such a way that the temperature does not exceed 75° C. The reaction is continued until the NCO content is less than 19%.

2 parts of the thixotropic vehicle thus obtained are added to 120 parts of the polyester obtained according to Example 2 and the mixture is reacted for 3 hours at 120° C. In the course thereof, the viscosity rises to 410 mPas.

The following experiments were carried out with resins 1 to 4.

EXPERIMENT A

Resin 1-4 were mixed, in accordance with the formulation shown below, with a commercially available polyester resin mixture which is typical of the products used in finishing layers:

|  | Parts |
|---|---|
| Polyester resin X | 60 |
| Polyester resin Y | 25 |
| Resin 1-4 | 15 |
| 50% strength benzoyl peroxide paste in plasticiser | 2 |

Cast sheets (3 mm thick) were prepared from the resin mixture and were cured for 3 hours at 75° C. and heat-treated for 15 hours at 100° C. Test specimens (50×50 mm²) were cut from these cast sheets and were stored in distilled water at room temperature for 50 days. The water absorption was then determined in accordance with DIN 53,475.

Sheets produced from a resin mixture according to the formulation shown below served as a comparison:

|  | Parts |
|---|---|
| Polyester resin X | 70 |
| Polyester resin Y | 30 |
| Benzoyl peroxide paste, 50% strength in plasticiser | 2 |
| Results | |
| Resin added | Water absorption (%) |
| None | 1.76 |
| Resin 1 | 2.42 |
| Resin 2 | 1.75 |
| Resin 3 | 1.77 |
| Resin 4 | 1.20 |

EXAMPLE B

Test specimens (30×100 m²) were produced from the sheets produced according to Example A, and were stored for 5 months in distilled water at room temperature. Thereafter, the appearance was assessed.

| Results Resin added | Appearance |
|---|---|
| None | a few tiny blisters |
| Resin 1 | destroyed |
| Resin 2 | no findings |
| Resin 3 | a few tiny blisters |
| Resin 4 | no findings |

EXAMPLE C

Pastes for producing sheet moulding compounds were prepared in accordance with the following formulations:

|  | Parts |
|---|---|
| Polyester resin Z | 85 |
| Resins 1-4 | 15 |
| Chalk | 100 |
| Zinc stearate | 4 |

| | Parts |
|---|---|
| Magnesium oxide | 1.5 |
| Benzoyl peroxide paste, 50% strength in plasticiser | 2 |

The mix was poured into 3 mm sheet moulds and allowed to thicken for four days. The sheets were then cured at 75° C. for 3 hours in a waterbath, after which they were heat-treated for 15 hours at 100° C. Test specimens (50×50 mm²) were cut from the sheets and the water absorption was determined on these in accordance with DIN 53,475. Sheets from a mix which contained 100 parts of polyester resin Z without added resin served as a comparison.

| Results Resin added | Water absorption (%) |
|---|---|
| None | 1.38 |

| Results Resin added | Water absorption (%) |
|---|---|
| Resin 1 | 5.79 |
| Resin 2 | 1.53 |
| Resin 3 | 1.99 |
| Resin 4 | 1.41 |

Characteristics of the various polyester resins X, Y and Z

| Polyester resin | Components of the polyester | Molar ratio | Acid number | OH number | Viscosity at 20° C. [mPas] | Styrene content |
|---|---|---|---|---|---|---|
| X | Maleic acid, Phthalic acid, Propanediol, Diethanediol | 0.5:0.5:0.5:0.5: | 22 | 27 | 1,850 | 31% |
| Y | Maleic acid, Adipic acid, Ethanediol, Diethanediol | 0.3:0.7:0.8:0.2 | 20 | 25 | 950 | 28% |
| Z | Maleic acid, Phthalic acid, Propanoic acid, Dipropanediol | 0.8:0.2:0.8:0.2 | 19 | 35 | 1,550 | 35% |

We claim:

1. A dispersion, free from copolymerizable monomers, of 10–80% by weight of powder insoluble in polyester and 90–20% by weight of $\alpha,\beta$-ethylenically unsaturated polyester which is the esterification product of dicarboxylic acid and mixture of monohydric and dihydric alcohols in a ratio of 1.5–2.5 moles of each of monohydric alcohol and dicarboxylic acid per mole of dihydric alcohol, said polyester having an acid number of 1–50 and a hydroxyl number of 10–80.

2. The dispersion of claim 1 which is a dispersion of 30–60% by weight of said powder and 70–40% by weight of said polyester.

3. Method of treating polyester resins by mixing therewith a dispersion according to claim 1.

* * * * *